(12) United States Patent
Michelfeit et al.

(10) Patent No.: US 12,142,093 B2
(45) Date of Patent: Nov. 12, 2024

(54) AUTOMATED WINDSHIELD DAMAGE DETECTION AND MITIGATION FOR AUTONOMOUS VEHICLES

(71) Applicant: Robert Bosch GmbH, Stuttgart (DE)

(72) Inventors: Ulrich C. Michelfeit, Freiberg (DE); Rameez Ahmad, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 17/831,864

(22) Filed: Jun. 3, 2022

(65) Prior Publication Data

US 2022/0398878 A1     Dec. 15, 2022

Related U.S. Application Data

(60) Provisional application No. 63/210,277, filed on Jun. 14, 2021.

(51) Int. Cl.
*G07C 5/08*     (2006.01)
*G01N 29/14*     (2006.01)
*G01N 29/44*     (2006.01)
*H04R 1/08*     (2006.01)

(52) U.S. Cl.
CPC ........... *G07C 5/0808* (2013.01); *G01N 29/14* (2013.01); *G01N 29/4445* (2013.01); *G07C 5/0816* (2013.01); *H04R 1/08* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 8,155,816 | B2 | 4/2012 | Rashid et al. |
| 9,076,277 | B2 * | 7/2015 | Delong .................. G07C 5/085 |
| 9,880,134 | B2 | 1/2018 | Baumgaertel |
| 10,071,732 | B2 | 9/2018 | Dudar et al. |
| 10,595,176 | B1 | 3/2020 | Gallagher |

(Continued)

FOREIGN PATENT DOCUMENTS

| | | | |
|---|---|---|---|
| CN | 204055720 U | * 12/2014 | |
| CN | 110719553 A | * 1/2020 | ......... G06F 21/6245 |

(Continued)

*Primary Examiner* — Justin S Lee
(74) *Attorney, Agent, or Firm* — Michael Best & Friedrich LLP (57) ABSTRACT

Detecting and classifying damage to a vehicle. One example system includes a microphone positioned to detect sound waves inside the vehicle, one or more sensors positioned on the vehicle and configured to sense a characteristic of a windshield of the vehicle, and an electronic processor communicatively coupled to the one or more sensors and the microphone. The electronic processor is configured to receive sensor information from the one or more sensors and to receive an electrical signal from the microphone. The electronic processor is configured to determine, based on the sensor information, whether a crack event has occurred. The electronic processor is configured to, in response to determining that a crack event has occurred, determine a cause of the crack event based on the electrical signal received from the microphone. The electronic processor is configured to execute a mitigation action based on the cause of the crack event.

20 Claims, 3 Drawing Sheets

(56) References Cited

U.S. PATENT DOCUMENTS

| | | |
|---|---|---|
| 10,775,806 B2 | 9/2020 | Abari et al. |
| 10,906,494 B1 * | 2/2021 | Chan ................. B60R 21/01538 |
| 2016/0253850 A1 * | 9/2016 | Baumgaertel ............ B60Q 9/00 |
| | | 701/33.9 |
| 2016/0266070 A1 * | 9/2016 | Baumgartel ......... G01N 29/075 |
| 2017/0089710 A1 | 3/2017 | Slusar |
| 2019/0212725 A1 | 7/2019 | Woodrow et al. |
| 2019/0257794 A1 * | 8/2019 | McGovern ........... G01N 29/043 |
| 2020/0013160 A1 * | 1/2020 | Francis .................. G01N 29/14 |
| 2020/0363362 A1 * | 11/2020 | Melcher ................. G01N 27/20 |
| 2021/0224618 A1 * | 7/2021 | Carbonelli ............ G06F 18/256 |
| 2022/0129860 A1 * | 4/2022 | Nvs ........................ G06V 20/40 |

FOREIGN PATENT DOCUMENTS

| | | | | |
|---|---|---|---|---|
| DE | 102016010705 A1 * | 4/2017 | | |
| DE | 102018119243 A1 * | 2/2019 | ........... | B60R 21/013 |
| EP | 3703028 A1 * | 9/2020 | ............. | B60K 35/00 |
| EP | 3766746 A1 * | 1/2021 | ............. | B60S 1/0859 |
| JP | 2003085660 A * | 3/2003 | | |
| JP | 2008071232 A * | 3/2008 | | |
| JP | 2020149305 A * | 9/2020 | | |
| KR | 20140036540 A * | 3/2014 | | |
| KR | 20160056116 A * | 5/2016 | | |
| WO | WO-2018142120 A1 * | 8/2018 | ........... | B60R 25/305 |

* cited by examiner

AUTOMATED WINDSHIELD DAMAGE DETECTION AND MITIGATION FOR AUTONOMOUS VEHICLES

CROSS-REFERENCE TO RELATED APPLICATIONS

The present application is related to and claims benefit under 35 U.S.C. § 119(e) from U.S. Provisional Patent Application Ser. No. 63/210,277, filed Jun. 14, 2021, entitled "Automated Windshield Damage Detection and Mitigation for Autonomous Vehicles," the entire contents of which being incorporated herein by reference.

BACKGROUND OF THE INVENTION

Vehicles capable of autonomous driving may be used to provide taxicab services. In some instances, fully autonomous taxicabs ferry passengers without the presence of a human driver in the vehicle. While operating, such vehicles may experience minor damage, for example, from stones or other objects impacting the vehicle's windshield. Vehicles are equipped with sensors to detect damage caused to the windshield.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As noted, fully autonomous taxicabs may operate to ferry passengers without the presence of a human driver in the vehicle. While operating on the road, a vehicle's windshield may be cracked by impacts with stones or other objects (e.g., road debris, ice, and the like. Vehicles are equipped with sensors to detect damage caused to the windshield. Sensors, for example, piezo sensors, acceleration sensors, and the like, are mounted to vehicles. Vehicle systems use sensor inputs detect cracks and other damage to the windshield. However, such sensors do not detect the cause of the damage.

Although minor damage may not affect the technical functionality of the vehicle, it may still be desirable to ascertain the cause of the damage. For example, in some legal jurisdictions, drivers are required under penalty of law to report accidents that result in property damage, even if the damage is not severe. Additionally, if the vehicle is an autonomous vehicle, applicable laws may require that the vehicle must be stopped until the accident is reported and handled by the proper authorities. Furthermore, in some instances, the cause of the damage to the windshield may merit further investigation by authorities or the vehicle operator (e.g., a gunshot, collision with an animal, etc.). Without a human driver present to determine and act on the cause of the damage, there is a need for the autonomous vehicle to be capable of doing so automatically. Accordingly, systems and methods are provided herein for, among other things, automated windshield damage detection, classification, and mitigation for autonomous driving systems.

Embodiments described herein provide in-vehicle sensing and classification systems that use audio captured by interior microphones and other sensor inputs to both detect damage and classify the event that caused the damage. As described herein, a "crack event" (i.e., a crack or cracks occurring in the glass of the vehicle's windshield) is detected using sensor data. The crack event, once detected, is classified to determine the cause of the damage. Using such embodiments, mitigations measures can be taken, if necessary, based on the cause of the crack event. For example, the vehicle can notify its operator (e.g., a fleet operator), contact the appropriate authorities, or both, depending on the nature of the crack event. Similarly, the vehicle can pull off the road, travel to an operations center for further investigation, or take other appropriate measures based on the damage causing event.

One example embodiment provides a system for detecting and classifying damage to a vehicle. The system includes a microphone positioned to detect sound waves inside the vehicle, one or more sensors positioned on the vehicle and configured to sense a characteristic of a windshield of the vehicle, and an electronic processor communicatively coupled to the one or more sensors and the microphone. The electronic processor is configured to receive sensor information from the one or more sensors. The electronic processor is configured to receive an electrical signal from the microphone. The electronic processor is configured to determine, based on the sensor information, whether a crack event has occurred. The electronic processor is configured to, in response to determining that a crack event has occurred, determine a cause of the crack event based on the electrical signal received from the microphone. The electronic processor is configured to execute a mitigation action based on the cause of the crack event.

Another example embodiment provides a method for detecting and classifying damage to a vehicle. The method includes receiving, with an electronic processor, sensor information from one or more sensors positioned on the vehicle and configured to sense a characteristic of a windshield of the vehicle. The method includes receiving an electrical signal from a microphone positioned to detect sound waves inside the vehicle. The method includes determining, based on the sensor information, whether a crack event has occurred. The method includes, in response to determining that a crack event has occurred, determining a cause of the crack event based on the electrical signal received from the microphone. The method includes executing a mitigation action based on the cause of the crack event Another example embodiment provides a vehicle. The vehicle includes a microphone positioned to detect sound waves inside the vehicle, one or more sensors positioned on the vehicle and configured to sense a characteristic of a windshield of the vehicle, and an electronic processor communicatively coupled to the one or more sensors and the microphone. The electronic processor is configured to receive sensor information from the one or more sensors. The electronic processor is configured to receive an electrical signal from the microphone. The electronic processor is configured to determine, based on the sensor information, whether a crack event has occurred. The electronic processor is configured to, in response to determining that a crack event has occurred, determine a cause of the crack event based on the electrical signal received from the microphone. The electronic processor is configured to execute a mitigation action based on the cause of the crack event.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should also be noted that a plurality of hardware and software-based devices, as well as a plurality of different structural components may be utilized to implement the invention. It should also be noted that a plurality of hardware and software-based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more electronic processors, one or more physical memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
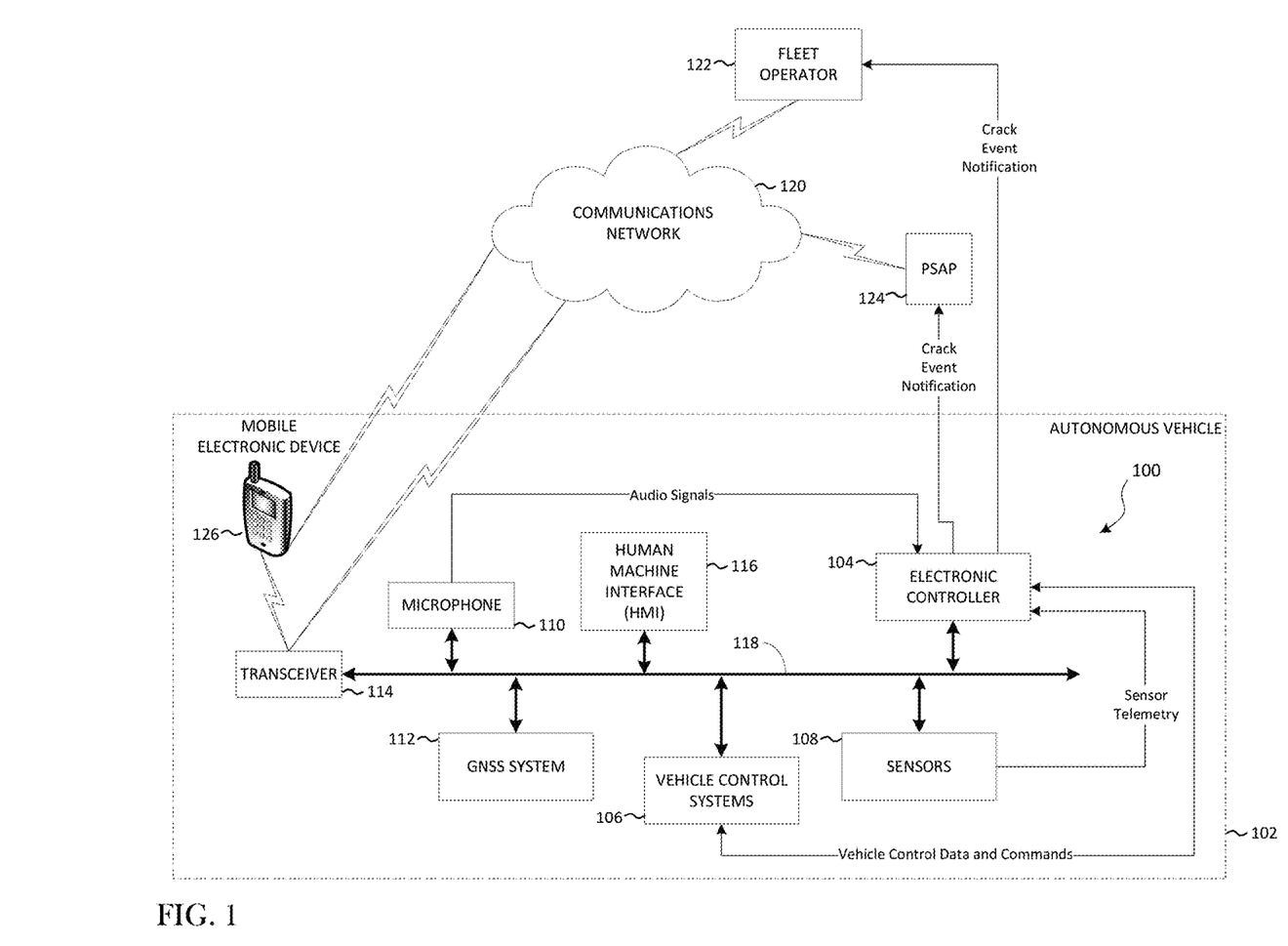
FIG. 1 is a block diagram of a vehicle control system, in accordance with some embodiments.

FIG. 1 is a block diagram of one exemplary embodiment of an autonomous vehicle control system 100. As described more particularly below, the autonomous vehicle control system 100 may be mounted on, or integrated into, a vehicle 102 and autonomously drives the vehicle. It should be noted that, in the description that follows, the terms "autonomous vehicle" and "automated vehicle" should not be considered limiting. The terms are used in a general way to refer to an autonomous or automated driving vehicle, which possesses varying degrees of automation (that is, the vehicle is configured to drive itself with limited, or in some cases no, input from a driver). The systems and methods described herein may be used with any vehicle capable of operating partially or fully autonomously, being controlled manually by a driver, or some combination of both.

The term "driver," as used herein, generally refers to an occupant of an autonomous vehicle who is seated in the driver's position, operates the controls of the vehicle while in a manual mode, or provides control input to the vehicle to influence the autonomous operation of the vehicle. The term "passenger," as used herein, generally refers to an occupant of an autonomous vehicle who passively rides in the vehicle without controlling the driving operations of the vehicle. However, both the driver and passenger of an autonomous vehicle may share some of the other's role. For example, a driver may hand over the driving controls to the vehicle's control systems and ride in the vehicle as a passenger for some or all of a trip.

The term "trip," as used herein, refers generally to the driving (e.g., autonomously) of a vehicle from a starting point to a final destination point, with or without one or more waypoints in between. For example, a trip may start at a taxicab dispatch center (i.e., the starting point), include a stop to pick up a passenger at the passenger's home (i.e., a waypoint), and continue to the workplace of the passenger (i.e., the destination).

In the example illustrated, the system 100 includes an electronic controller 104, vehicle control systems 106, sensors 108, a microphone 110, a GNSS (global navigation satellite system) system 112, a transceiver 114, and a human machine interface (HMI) 116. The components of the system 100, along with other various modules and components are electrically coupled to each other by or through one or more control or data buses (for example, the bus 118), which enable communication therebetween. The use of control and data buses for the interconnection between, and communication among, the various modules and components would be known to a person skilled in the art in view of the invention described herein. In some embodiments, the bus 118 is a Controller Area Network (CAN™) bus. In some embodiments, the bus 118 is an automotive Ethernet™, a FlexRay™ communications bus, or another suitable wired bus. In alternative embodiments, some or all of the components of the system 100 may be communicatively coupled using suitable wireless modalities (for example, Bluetooth™ or near field communication). For ease of description, the system 100 illustrated in FIG. 1 includes one of each of the foregoing components. Alternative embodiments may include one or more of each component or may exclude or combine some components.

The electronic controller 104 (described more particularly below with respect to FIG. 2) operates the vehicle control systems 106 and the sensors 108 to autonomously control the vehicle as described herein. The electronic controller 104 receives sensor telemetry from the sensors 108 and determines control data and commands for the vehicle. The electronic controller 104 transmits the vehicle control data to, among other things, the vehicle control systems 106 to drive the vehicle (for example, by generating braking signals, acceleration signals, steering signals).

The vehicle control systems 106 include controllers, sensors, actuators, and the like for controlling aspects of the operation of the vehicle 102 (for example, steering, acceleration, braking, shifting gears, and the like). The vehicle control systems 106 are configured to send and receive data relating to the operation of the vehicle 102 to and from the electronic controller 104.

The sensors 108 determine one or more attributes of the vehicle and its surrounding environment and communicate information regarding those attributes to the other components of the system 100 using, for example, electrical signals. The vehicle attributes include, for example, the position of the vehicle or portions or components of the vehicle, the movement of the vehicle or portions or components of the vehicle, the forces acting on the vehicle or portions or components of the vehicle, the proximity of the vehicle to other vehicles or objects (stationary or moving), yaw rate, sideslip angle, steering wheel angle, superposition angle, vehicle speed, longitudinal acceleration, and lateral acceleration, and the like. The sensors 108 may include, for example, vehicle control sensors (for example, sensors that detect accelerator pedal position, brake pedal position, and steering wheel position [steering angle]), wheel speed sensors, vehicle speed sensors, yaw sensors, force sensors, odometry sensors, and vehicle proximity sensors (for example, camera, radar, LIDAR, and ultrasonic). In some embodiments, the sensors 108 include one or more cameras configured to capture one or more images of the environment surrounding the vehicle 102 according to their respective fields of view. The cameras may include multiple types of imaging devices/sensors, each of which may be located at different positions on the interior or exterior of the vehicle 102. In some embodiments, the sensors 108 include one or more sensors positioned to sense when damage (e.g., cracks in the glass) occurs to the windshield of the vehicle. In some embodiments, a piezoelectric sensor (e.g., a polyvinylidene fluoride (PVDF) film) is mounted on or integrated into the windshield. The piezoelectric sensor may be configured as a strain gauge to detect when an object impacts with the windshield. The piezoelectric sensor may be also be configured to detect the noise made when the windshield glass breaks or cracks. In some embodiments, an accelerometer is mounted on or integrated into the windshield to detect impacts with and breakage of the windshield. In some embodiments, a combination of approaches is used.

The microphone 110 is a transducer capable of sensing sound, converting the sound to electrical signals, and transmitting the electrical signals to the electronic controller 104. In some embodiments, the microphone 110 is a microphone array. In some embodiments, the microphone 110 is positioned within the interior (e.g., the cabin) of the vehicle 102 and is configured to sense sounds that may or may not be perceivable by the human ear. Of course, such sound waves may be generated outside the vehicle and propagate through surfaces (e.g., the windshield) to be picked up inside the vehicle by the microphone. For example, an object may strike the windshield, creating sound, which is audible inside the vehicle. In another example, sounds not caused by contact with the vehicle (e.g., gunshots) may be audible inside the vehicle. As described herein, the electronic controller 104 processes the electrical signals received from the microphone 110 to produce an audio signal, which may be analyzed to determine the cause of windshield damage detected by the sensors 108. In some embodiments, the microphone 110 includes on board signal processing circuitry, which produces and transmits audio signals to the electronic controller 104 for processing.

The electronic controller 104 receives and interpret the signals received from the sensors 108 and the microphone 110 to automatically detect damage to the vehicle's windshield.

In some embodiments, the system 100 includes, in addition to the sensors 108, a GNSS (global navigation satellite system) system 112. The GNSS system 112 receives radiofrequency signals from orbiting satellites using one or more antennas and receivers (not shown). The GNSS system 112 determines geo-spatial positioning (i.e., latitude, longitude, altitude, and speed) for the vehicle based on the received radiofrequency signals. The GNSS system 112 communicates this positioning information to the electronic controller 104. The electronic controller 104 may use this information in conjunction with or in place of information received from some of the sensors 108 when controlling the autonomous vehicle 102.

The transceiver 114 includes a radio transceiver communicating data over one or more wireless communications networks (e.g., cellular networks, satellite networks, land mobile radio networks, etc.) including the communications network 120. The communications network 120 is a communications network including wireless connections, wired connections, or combinations of both. The communications network 120 may be implemented using a wide area network, for example, the Internet (including public and private IP networks), a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network and one or more local area networks, for example, a Bluetooth™ network or Wi-Fi network, and combinations or derivatives thereof.

The transceiver 114 also provides wireless communications within the vehicle using suitable network modalities (e.g., Bluetooth™, near field communication (NFC), Wi-Fi™, and the like). Accordingly, the transceiver 114 communicatively couples the electronic controller 104 and other components of the system 100 with networks or electronic devices both inside and outside the vehicle 102. For example, the electronic controller 104, using the transceiver 114, can communicate with a fleet operator 122 for the autonomous vehicle 102 to send and receive data, commands, and other information (e.g., crack event notifications). In another example, the electronic controller 104, using the transceiver 114, can contact emergency authorities (e.g., the public safety answering point (PSAP) 124) using enhanced 911 (E911) communications modalities. The transceiver 114 includes other components that enable wireless communication (e.g., amplifiers, antennas, baseband processors, and the like), which for brevity are not described herein and which may be implemented in hardware, software, or a combination of both. Some embodiments include multiple transceivers or separate transmitting and receiving components (e.g., a transmitter and a receiver) instead of a combined transceiver.

The HMI 116 provides visual output, such as, for example, graphical indicators (i.e., fixed or animated icons), lights, colors, text, images, combinations of the foregoing, and the like. The HMI 116 includes a suitable display mechanism for displaying the visual output, such as, for example, an instrument cluster, a mirror, a heads-up display, a center console display screen (for example, a liquid crystal display (LCD) touch screen, or an organic light-emitting diode (OLED) touch screen), or other suitable mechanisms. In alterative embodiments, the display screen may not be a touch screen. In some embodiments, the HMI 116 displays a graphical user interface (GUI) (for example, generated by the electronic controller and presented on a display screen) that enables a driver or passenger to interact with the autonomous vehicle 102. The HMI 116 may also provide audio output to the driver such as a chime, buzzer, voice output, or other suitable sound through a speaker included in the HMI 116 or separate from the HMI 116. In some embodiments, HMI 116 provides haptic outputs to the driver by vibrating one or more vehicle components (e.g., the vehicle's steering wheel and the seats), for example, using a vibration motor. In some embodiments, HMI 116 provides a combination of visual, audio, and haptic outputs.

In some embodiments, the electronic controller 104, using the transceiver 114, communicates with a mobile electronic device 126. In alternative embodiments, the mobile electronic device 126, when near to or inside the autonomous vehicle 102, may be communicatively coupled to the electronic controller 104 via a wired connection using, for example, a universal serial bus (USB) connection or similar connection. The mobile electronic device 126 may be, for example, a smart telephone, a tablet computer, personal digital assistant (PDA), a smart watch, or any other portable or wearable electronic device that includes or can be connected to a network modem or similar components that enable wireless or wired communications (e.g., a processor, memory, i/o interface, transceiver, antenna, and the like). In some embodiments, the HMI 116 communicates with the mobile electronic device 126 to provide the visual, audio, and haptic outputs through the mobile electronic device 126 when the mobile electronic device 126 is communicatively coupled to the autonomous vehicle 102.

Figure 2:
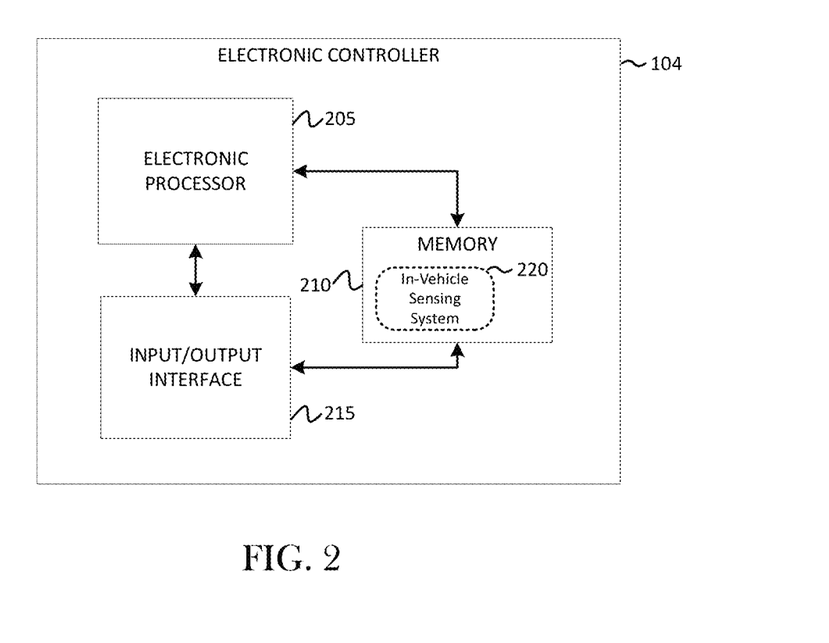
FIG. 2 schematically illustrates an electronic controller of the system of FIG. 1, in accordance with some embodiments.

FIG. 2 illustrates an exemplary embodiment of the electronic controller 104, which includes an electronic processor 205 (for example, a microprocessor, application specific integrated circuit, etc.), a memory 210, and an input/output interface 215. The memory 210 may be made up of one or more non-transitory computer-readable media and includes at least a program storage area and a data storage area. The program storage area and the data storage area can include combinations of different types of memory, such as read-only memory ("ROM"), random access memory ("RAM") (for example, dynamic RAM ("DRAM"), synchronous DRAM ("SDRAM"), etc.), electrically erasable programmable read-only memory ("EEPROM"), flash memory, or other suitable memory devices. The electronic processor 205 is coupled to the memory 210 and the input/output interface 215. The electronic processor 205 sends and receives information (for example, from the memory 210 and/or the input/output interface 215), and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for autonomous vehicle control, and for performing methods as described herein. In the embodiment illustrated, the memory 210 stores, among other things, an in-vehicle sensing system 220, which operates as described herein to detect, classify, and mitigate windshield crack events.

The input/output interface 215 transmits and receives information from devices external to the electronic controller 104 (for example, over one or more wired and/or wireless connections), for example, components of the system 100 via the bus 118. The input/output interface 215 receives input (e.g., from the sensors 108, the HMI 116, etc.), provides system output (e.g., to the HMI 116, etc.), or a combination of both. The input/output interface 215 may also include other input and output mechanisms, which for brevity are not described herein and which may be implemented in hardware, software, or a combination of both.

In some embodiments, the electronic controller 104 uses one or more machine learning methods to analyze data to classify windshield crack events (as described herein). Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics.

It should be understood that although FIG. 2 illustrates only a single electronic processor 205, memory 210, and input/output interface 215, alternative embodiments of the electronic controller 104 may include multiple processors, memory modules, and/or input/output interfaces. It should also be noted that the system 100 may include other electronic controllers, each including similar components as, and configured similarly to, the electronic controller 104. In some embodiments, the electronic controller 104 is implemented partially or entirely on a semiconductor (for example, a field-programmable gate array ["FPGA"] semiconductor) chip. Similarly, the various modules and controllers described herein may be implemented as individual controllers, as illustrated, or as components of a single controller. In some embodiments, a combination of approaches may be used.

Figure 3:
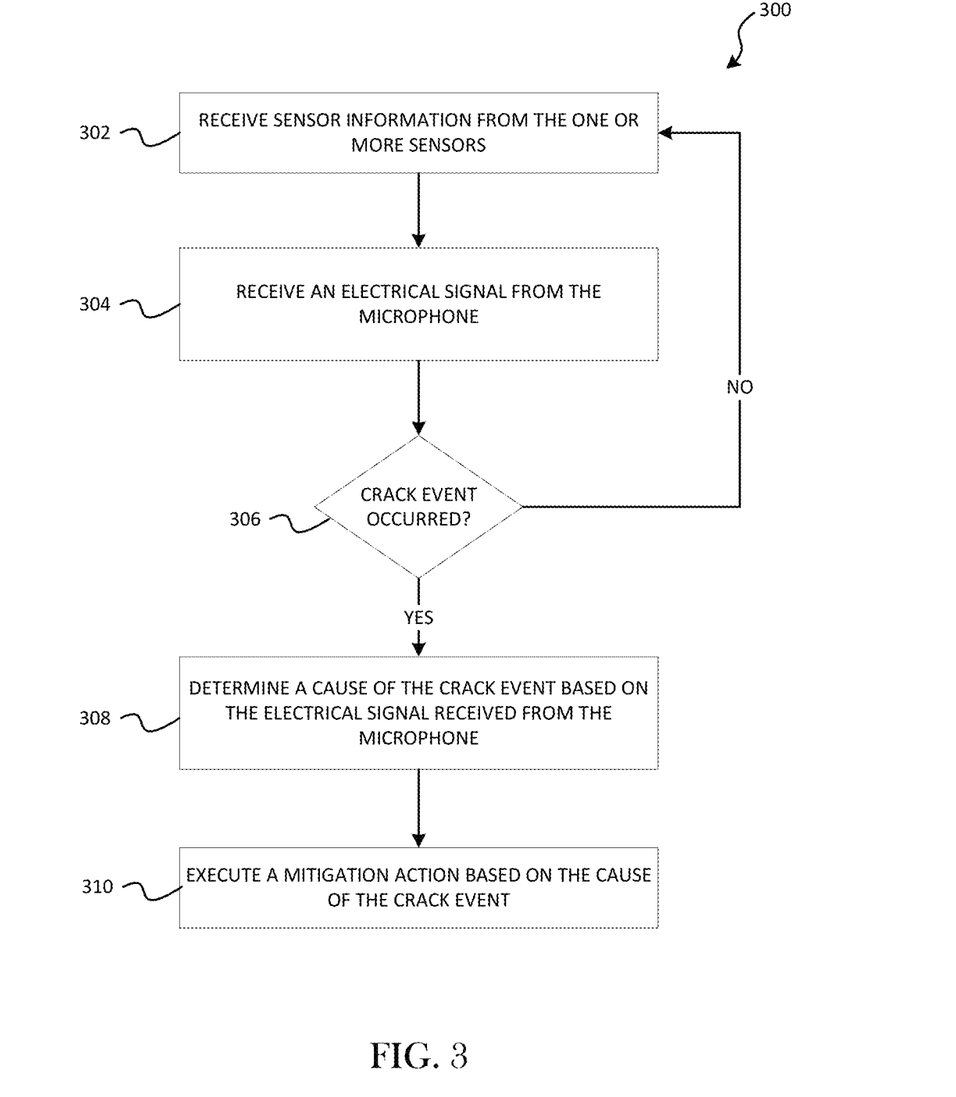
FIG. 3 is a flow chart of a method performed by the system of FIG. 1 to detect and classify windshield damage, in accordance with some embodiments.

As noted, autonomous taxicabs may operate without a human driver. While operating, stones may strike the windshield, causing minor or major damage to the vehicle. Fleet operators have an interest in operating well-maintained vehicles and need to be notified of such damage. In addition, some causes of windshield damage (e.g., being struck by a bullet or an animal) may require more immediate attention such as alerting the authorities or taking another mitigation measure. Accordingly, FIG. 3 illustrates an example method 300 for detecting, classifying, and/or mitigating windshield crack events. Although the method 300 is described in conjunction with the system 100 as described herein, the method 300 could be used with other systems and vehicles. In addition, the method 300 may be modified or performed differently than the specific example provided. As an example, the method 300 is described as being performed by the electronic controller 104 and, in particular, the electronic processor 205. However, it should be understood that in some embodiments, portions of the method 300 may be performed by other devices or subsystems of the system 100.

At block 302, the electronic processor 205 receives sensor information from one or more sensors (e.g., the sensors 108) of the vehicle. For example, the electronic processor 205 may receive signals (e.g., via a CAN bus) from a piezoelectric film sensor, an accelerometer, a camera, or another sensor positioned to sense a characteristic (e.g., vibrations or other movement, sound, etc.) of the windshield.

At block 304, the electronic processor 205 receives an electrical signal from the microphone (e.g., the microphone 110). In some embodiments, the microphone is mounted inside the vehicle's cabin, enabling it to sense and convert to electrical signals soundwaves from inside the vehicle. In some embodiments, the microphone is configured to process the electrical signals and transmit audio samples to the electronic processor 205. In some embodiments, the electronic processor 205 receives signals from the microphone continuously. In some embodiments, the electronic processor 205 receives periodic signals from the microphone. In some embodiments, the signals received from the microphone are stored in a buffer or other memory of the electronic controller 104.

At block 306, the electronic processor 205 determines, based on the sensor information, whether a crack event has occurred. In one example, the electronic processor 205 receives information from a piezoelectric film sensor representing vibrations of the windshield and determines, from that information, that the vibrations are consistent with a crack or cracks forming in the windshield. In another example, the electronic processor 205 receives information from a piezoelectric film sensor representing sounds generated by the windshield glass and determines, from that information, that the sounds are consistent with a crack or cracks forming in the windshield. In another example, the electronic processor 205 receives information from accelerometer representing movement of the windshield glass and determines, from that information, that the movement is consistent with a crack or cracks forming in the windshield. In some embodiments, the electronic processor 205 analyzes the received sensor information to determine whether a crack event has occurred. In some embodiments, the sensors are configured to detect crack events directly and send notifications of the detected crack events to the electronic processor 205.

As illustrated in FIG. 3, when the electronic processor 205 does not determine (at block 306) that a crack event has occurred (e.g., the data received from the one or more sensors 108 does not indicate glass breakage), the electronic processor 205 continues receiving (at block 302) and processing sensor data to detect crack events. In some embodiments, the electronic processor 205 is configured to continuously to detect and classify crack events. In other embodiments, the electronic processor 205 is configured to execute the method 300 periodically to detect crack events.

At block 308, in response to determining that a crack event has occurred (at block 306), the electronic processor 205 determines a cause of the crack event based on the electrical signal received from the microphone.

In one example, in response to determining that a crack event has occurred, the electronic processor 205 extracts, from the electrical signal received from the microphone, an audio signal produced by sound waves sensed inside the vehicle during the crack event. For example, the electronic processor 205 may extract an audio signal that encompasses a time period beginning just before the crack event occurred and ending just after the crack event occurred (e.g., five seconds before and after the crack event occurred). In some embodiments, the electronic processor 205 may continuously process the signals from the microphone into audio and store the audio in a buffer or other memory. In some embodiments, the electronic processor 205 stores the electrical signals and processes them into audio only when a crack event is detected. In some embodiments, the extracted audio is filtered by the electronic processor 205 (or a suitable digital signal processor of the electronic controller 104) to remove background noise (e.g., road noise, noise from the vehicle's climate control system, audio from the vehicle's entertainment system, etc.). In some embodiments, the various vehicle systems feedback information to the electronic processor 205 for use in the filtering process (e.g., a continuous sample of an audio output from the vehicle's entertainment system, indications of vehicle speed, the settings for the vehicle's climate control, etc.). In some embodiments, the ambient noise of the vehicle interior is continuously or periodically sampled to produce a filter, which can be used to reduce noise in the extracted audio before it is analyzed.

In some embodiments, the electronic processor 205 determines the cause for the crack event by classifying the extracted audio signal using a machine learning algorithm (e.g., a neural network or a classifier), executable by the electronic processor 205. In some embodiments, the machine learning algorithm is trained using historical crack event data. For example, the machine learning algorithm is fed training data that includes example inputs (e.g., sound recordings representative of particular crack events) and corresponding desired outputs (e.g., indications of what caused the crack event (and therefore generated the sound recording being analyzed)). The causes of crack events may include, for example, a stone strike, an ice strike, a gunshot, and an animal collision. The training data may include metadata (in addition to an identifier of the cause) for the sound recordings. Metadata may include, for example, the vehicle speed at the time of the recording, the model of vehicle in which the recording was made, the state of the vehicle at the time of the recording (e.g., braking, accelerating, turning, etc.), and environmental conditions at the time of the recording (e.g., ambient temperature, ambient humidity, weather conditions, road conditions, etc.). By processing the training data, the machine learning algorithm progressively develops a prediction model that maps inputs to the outputs included in the training data.

In some embodiments, the extracted audio is fed into the machine learning algorithm, which identifies the cause of the crack event. In some embodiments, the machine learning algorithm generates multiple potential causes based on the audio signal, and determines, for each potential cause, a confidence score. A confidence score indicates how likely it is that the potential cause is the cause of the crack event (e.g., how closely the extracted audio matches to audio recordings for the same type of cause as the potential cause).

In such embodiments, the electronic processor 205 selects the cause from the plurality of potential causes based on the confidence score. For example, the cause with the highest confidence score may be selected.

In some embodiments a confidence score is a numerical representation (for example, from 0 to 1) confidence. For example, the extracted audio may be a 60% match with one potential cause but may be an 80% match with another potential cause, resulting in confidence scores of 0.6 and 0.8, respectively.

Optionally, in some embodiments, the electronic processor 205 assigns a weight to one or more of the potential causes based on metadata for the potential cause and selects the cause from the plurality of potential causes based on the confidence score and the weight.

The weight is used to indicate a how significant a particular piece of metadata is to identify a potential cause as the cause, relative to the other potential causes. For example, where both the vehicle experiencing the crack event and the vehicle that produced the training data for potential cause are the same model, the potential cause may be assigned a higher weight that where the metadata indicates two different vehicle models. In another example, where the vehicle experiencing the crack event was accelerating and the vehicle that produced the training data for potential cause was decelerating, the potential cause may be assigned a lower weight that where the metadata indicates that both vehicles were accelerating. Metadata with higher weights contribute more to the confidence score. For example, a smaller quantity of higher weighted metadata may result in a higher confidence score than a larger quantity of lower-weighted metadata. In such embodiments, the electronic processor 205 determines, for each of the plurality of potential causes, a weighted confidence score based on the confidence score and the weight. For example, the electronic processor 205 may multiply the confidence scores by the weight assigned. In such embodiments, the electronic processor 205 selects the cause from the plurality of potential causes based on the weighted confidence score. For example, the cause with the highest weighted confidence score may be selected.

In some embodiments, weights statically pre-determined for each type of metadata. In some embodiments. the weights may be determined using the machine learning algorithm. Over time, as matches are determined for causes and confirmed or rejected by observation, the machine learning algorithm may determine that particular metadata are more determinative to a high confidence score than others, and thus increase the weight for those metadata.

Regardless of how the cause is determined, at block 310, the electronic processor 205 executes a mitigation action based on the cause of the crack event. In some embodiments, the mitigation action includes transmitting (e.g., via the transceiver 114) a notification to a fleet operator. For example, a suitable network message or API may be used to send a notification that indicates a crack event has occurred, the time and place of the crack event, the cause of the crack event, and the like. The fleet operator, in response to receiving the notification, may issue commands to the electronic controller 104 to drive the vehicle to a fleet facility for maintenance, to drive the vehicle safely out of traffic until another vehicle can be sent for the passenger(s), etc.

In some embodiments, the mitigation action includes transmitting (e.g., via the transceiver 114) transmitting a notification to a public safety agency. For example, the electronic processor 205 may send an alert relaying the cause of the crack event and other information using an E911 system.

In some embodiments, the mitigation action includes controlling the vehicle exit traffic. For example, where the cause of the crack event is an animal collision or a gunshot, the electronic controller 104 may autonomously operate the vehicle to travel a predetermined distance from the location of the crack event and pull off the roadway into a parking lot or other location relatively free of vehicle traffic. In some embodiments, the electronic controller 104 may autonomously operate the vehicle to travel to travel to a police station, fire station, or other secure location.

In some embodiments, the mitigation action includes producing an alert on a human machine interface of the vehicle to inform any passengers of the crack event and any other mitigation actions being taken. For example, a display of the HMI 116 may display a message such as "VEHICLE WINDSHIELD HAS BEEN DAMAGED BY A STONE STRIKE. WE ARE PROCEEDING TO A SERVICE FACILITY TO ASSESS FURTHER DAMAGE." or "VEHICLE WINDSHIELD HAS BEEN DAMAGED BY AN ANIMAL COLLISION. WE ARE PULLING OFF THE ROAD AND ALERTING PUBLIC SAFETY. PLEASE REMAIN INSIDE THE VEHICLE." In some embodiments, the HMI 116 may speak the alerts aloud to the vehicle passenger. In some embodiments, a combination of alerts may be used. In some embodiments, the electronic processor 205 may send an alert to a mobile electronic device of the passenger (e.g., using the transceiver 114).

In some embodiments, multiple mitigation actions are combined.

In the example described, the electronic processor 205 determines for itself, using sensor information, whether a crack event has occurred. In some alternative embodiments, the electronic processor 205 may receive a notification from another electronic controller or processor (e.g., embedded in a windshield sensor) that a crack event has occurred and execute the method 300 beginning with block 308 to classify the crack event and execute mitigation actions.

Thus, the embodiments described herein provide, among other things, a control system for an autonomous vehicle configured to detect and classify windshield damage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Various features, advantages, and embodiments are set forth in the following claims.

What is claimed is:

1. A system for detecting and classifying damage to a vehicle, the system comprising:
    a microphone positioned to detect sound waves inside the vehicle;
    one or more sensors positioned on the vehicle and configured to sense a characteristic of a windshield of the vehicle; and
    an electronic processor communicatively coupled to the one or more sensors and the microphone and configured to
        receive sensor information from the one or more sensors;
        receive an electrical signal from the microphone;
        determine, based on the sensor information, whether a crack event has occurred, wherein the crack event is caused by an impact of an object with the windshield;
        in response to determining that the crack event has occurred, determine a cause of the crack event based on the electrical signal received from the microphone, wherein determining the cause includes determining a particular type for the object; and
        execute a mitigation action based on the cause of the crack event.

2. The system of claim 1, wherein the electronic processor is further configured to:
    in response to determining that a crack event has occurred, extract, from the electrical signal, an audio signal produced by sound waves sensed inside the vehicle during the crack event; and
    determine the cause for the crack event by classifying the audio signal using a machine learning algorithm.

3. The system of claim 2, wherein the machine learning algorithm is trained on historical crack event data.

4. The system of claim 2, wherein the electronic processor is further configured to classify the audio signal using a machine learning algorithm by
    generating a plurality of potential causes based on the audio signal;
    determining, for each potential cause, a confidence score; and
    selecting the cause from the plurality of potential causes based on the confidence score.

5. The system of claim 4, wherein the electronic processor is further configured to:
    assign a weight to each of the plurality of potential causes based on metadata for the potential cause; and
    select the cause from the plurality of potential causes based on the confidence score and the weight.

6. The system of claim 1, wherein the mitigation action is at least one selected from the group consisting of transmitting a notification to a fleet operator, transmitting a notification to a public safety agency, controlling the vehicle exit traffic, and producing an alert on a human machine interface of the vehicle.

7. The system of claim 1, wherein the one or more sensors includes at least one selected from the group consisting of a piezoelectric sensor and an accelerometer.

8. The system of claim 1, wherein the cause of the crack event is one selected from the group consisting of a stone strike, an ice strike, a gunshot, and an animal collision.

9. A method for detecting and classifying damage to a vehicle, the method comprising:
    receiving, with an electronic processor, sensor information from one or more sensors positioned on the vehicle and configured to sense a characteristic of a windshield of the vehicle;
    receiving an electrical signal from a microphone positioned to detect sound waves inside the vehicle;
    determining, based on the sensor information, whether a crack event has occurred, where in the crack event is caused by an impact of an object with the windshield;
    in response to determining that the crack event has occurred, determining a cause of the crack event based on the electrical signal received from the microphone, wherein determining the cause includes determining a particular type for the object; and
    executing a mitigation action based on the cause of the crack event.

10. The method of claim 9, further comprising:
    in response to determining that a crack event has occurred, extracting, from the electrical signal, an audio signal produced by sound waves sensed inside the vehicle during the crack event; and
    determining the cause for the crack event by classifying the audio signal using a machine learning algorithm.

11. The method of claim 10, wherein the machine learning algorithm is trained on historical crack event data.

12. The method of claim 10, wherein classifying the audio signal using a machine learning algorithm includes:
    generating a plurality of potential causes based on the audio signal;
    determining, for each potential cause, a confidence score; and
    selecting the cause from the plurality of potential causes based on the confidence score.

13. The method of claim 12, wherein the electronic processor is further configured to:
    assign a weight to each of the plurality of potential causes based on metadata for the potential cause; and
    select the cause from the plurality of potential causes based on the confidence score and the weight.

14. The method of claim 9, wherein executing the mitigation action includes performing at least one selected from the group consisting of transmitting a notification to a fleet operator, transmitting a notification to a public safety agency, controlling the vehicle exit traffic, and producing an alert on a human machine interface of the vehicle.

15. The method of claim 9, wherein the one or more sensors includes at least one selected from the group consisting of a piezoelectric sensor and an accelerometer.

16. The method of claim 9, wherein the cause of the crack event is one selected from the group consisting of a stone strike, an ice strike, a gunshot, and an animal collision.

17. A vehicle comprising:
a microphone positioned to detect sound waves inside the vehicle;
one or more sensors positioned on the vehicle and configured to sense a characteristic of a windshield of the vehicle; and
an electronic processor communicatively coupled to the one or more sensors and the microphone and configured to
receive sensor information from the one or more sensors;
receive an electrical signal from the microphone;
determine, based on the sensor information, whether a crack event has occurred, wherein the crack event is caused by an impact of an object with the windshield;
in response to determining that the crack event has occurred, extract, from the electrical signal, an audio signal produced by sound waves sensed inside the vehicle during the crack event;
determine the cause for the crack event by classifying the audio signal using a machine learning algorithm, wherein determining the cause includes determining a particular type for the object; and
execute a mitigation action based on the cause of the crack event.

18. The vehicle of claim 17, wherein the electronic processor is further configured to classify the audio signal using a machine learning algorithm by
generating a plurality of potential causes based on the audio signal;
determining, for each potential cause, a confidence score; and
selecting the cause from the plurality of potential causes based on the confidence score.

19. The vehicle of claim 18, wherein the electronic processor is further configured to:
assign a weight to each of the plurality of potential causes based on metadata for the potential cause; and
select the cause from the plurality of potential causes based on the confidence score and the weight.

20. The vehicle of claim 17, wherein the mitigation action is at least one selected from the group consisting of transmitting a notification to a fleet operator, transmitting a notification to a public safety agency, controlling the vehicle exit traffic, and producing an alert on a human machine interface of the vehicle.

* * * * *